US012239586B2

(12) United States Patent
Gfoehler et al.

(10) Patent No.: US 12,239,586 B2
(45) Date of Patent: Mar. 4, 2025

(54) MECHANICAL WHEELCHAIR DRIVE AND WHEELCHAIR HAVING SUCH A MECHANICAL WHEELCHAIR DRIVE

(71) Applicant: TECHNISCHE UNIVERSITAET WIEN, Vienna (AT)

(72) Inventors: Margit Gfoehler, Vienna (AT); Nithin Babu Rajendra Kurup, Vienna (AT); Markus Puchinger, Vienna (AT)

(73) Assignee: TECHNISCHE UNIVERSITAET WIEN, Vienna (AT)

(*) Notice: Subject to any disclaimer, the term of this patent is extended or adjusted under 35 U.S.C. 154(b) by 809 days.

(21) Appl. No.: 17/260,980

(22) PCT Filed: Jul. 16, 2019

(86) PCT No.: PCT/AT2019/060235
§ 371 (c)(1),
(2) Date: Jan. 15, 2021

(87) PCT Pub. No.: WO2020/014720
PCT Pub. Date: Jan. 23, 2020

(65) Prior Publication Data
US 2021/0290458 A1 Sep. 23, 2021

(30) Foreign Application Priority Data
Jul. 16, 2018 (AT) .............................. A 50609/2018

(51) Int. Cl.
*A61G 5/02* (2006.01)
*A61G 5/10* (2006.01)
(Continued)

(52) U.S. Cl.
CPC ............. *A61G 5/026* (2013.01); *A61G 5/027* (2013.01); *A61G 5/1005* (2013.01); *A61G 5/125* (2016.11)

(58) Field of Classification Search
CPC ........ A61G 5/026; A61G 5/027; A61G 5/125; A61G 5/1005; B62M 3/04; B62M 3/06
(Continued)

(56) References Cited

U.S. PATENT DOCUMENTS 550,206 A * 11/1895 Tomkins
623,863 A * 4/1899 Atterbury
(Continued)

FOREIGN PATENT DOCUMENTS

DE 3413312 A1 1/1986
DE 8803670 U1 7/1989
(Continued)

OTHER PUBLICATIONS

ISA European Patent Office, International Search Report Issued in Application No. PCT/AT2019/060235, Sep. 11, 2019, WIPO, 2 pages.

*Primary Examiner* — Anne Marie M Boehler
(74) *Attorney, Agent, or Firm* — McCoy Russell LLP

(57) ABSTRACT

The invention relates to a mechanical wheelchair drive, comprising a rotatably mounted lever, a handle fastened to the lever, and a force transfer unit for transferring rotational motion of the lever to a wheelchair wheel, wherein the lever has a variable length and is guided along a closed guide of a guide plate, said guide deviating from the circular form, such that the length of the lever changes during the rotational motion.

16 Claims, 5 Drawing Sheets

(51) Int. Cl.
*A61G 5/12* (2006.01)
*B62M 3/06* (2006.01)

(58) Field of Classification Search
USPC ....... 74/594.3; 280/241, 244, 247, 249, 250, 280/250.1, 256
See application file for complete search history.

(56) References Cited

U.S. PATENT DOCUMENTS

| | | | | | | |
|---|---|---|---|---|---|---|
| 653,873 | A | * | 7/1900 | Malone | | |
| 4,109,927 | A | * | 8/1978 | Harper | A61G 5/023 | 280/282 |
| 4,758,013 | A | | 7/1988 | Agrillo | | |
| 5,037,120 | A | | 8/1991 | Parisi | | |
| 5,816,598 | A | * | 10/1998 | Dodakian | B62M 1/12 | 280/250 |
| 5,873,589 | A | * | 2/1999 | Hallett | A61G 5/1051 | 224/412 |
| 6,910,701 | B1 | * | 6/2005 | Long | A61G 5/026 | 280/250 |
| 2001/0052271 | A1 | * | 12/2001 | Orioli | B62M 3/04 | 74/594.3 |
| 2014/0069229 | A1 | * | 3/2014 | Chang | B62M 3/04 | 74/594.1 |
| 2014/0217695 | A1 | * | 8/2014 | Landau | B62M 3/02 | 74/594.1 |
| 2015/0175240 | A1 | * | 6/2015 | Mangini | B62M 1/12 | 280/240 |
| 2022/0331177 | A1 | * | 10/2022 | Guo | A63B 23/0476 | |

FOREIGN PATENT DOCUMENTS

| | | | | | |
|---|---|---|---|---|---|
| FR | 2562497 | | * | 9/1982 | B62M 3/06 |
| WO | 2004110329 | A1 | | 12/2004 | |
| WO | 2014199110 | A1 | | 12/2018 | |

* cited by examiner

MECHANICAL WHEELCHAIR DRIVE AND WHEELCHAIR HAVING SUCH A MECHANICAL WHEELCHAIR DRIVE

CROSS REFERENCE TO RELATED APPLICATIONS

The present application is a U.S. National Phase of International Application No. PCT/AT2019/060235 entitled "MECHANICAL WHEELCHAIR DRIVE AND WHEELCHAIR HAVING SUCH A MECHANICAL WHEELCHAIR," and filed on Jul. 16, 2019. International Application No. PCT/AT2019/060235 claims priority to Austrian Patent Application No. A 50609/2018 filed on Jul. 16, 2018. The entire contents of each of the above-listed applications are hereby incorporated by reference for all purposes.

TECHNICAL FIELD

The invention relates to a mechanical wheelchair drive comprising a rotatably mounted lever, a handle fastened to the lever and a force transfer unit for transferring a rotational motion of the lever to a wheelchair wheel.

Since the mechanical wheelchair drive is suitable for mounting on a wheelchair, the invention further relates to a wheelchair having a seat surface, a backrest, foot supports and at least two wheelchair wheels.

BACKGROUND AND SUMMARY

In many cases, wheelchairs in everyday use are driven by hand by the affected person. For this purpose, the wheelchair wheels typically have easy-to-grip hand rims along their circumference with the aid of which the respective wheelchair wheel can be directly driven and also braked by pull-like or jerky movements.

As a result of their maneuverability and their low weight, wheelchairs which can be driven by means of hand rims can be easily used in everyday life and therefore are the preferred type of wheelchair for many disabled people. Since these wheelchairs are driven by muscle power, in this type of progressive movement the physical fitness of the affected persons is at the same time also maintained or improved at least in the area of the upper body However, when using wheelchairs which are driven by means of hand rims, it must be accepted that the movement sequence required for driving severely stresses the joints of the upper extremities which in the case of persons who are usually dependent on the use of a wheelchair, can result in long-term damage, chronic pain or other impairments. In addition, due to the continuously repeated movement sequence, the groups of muscles in the shoulder, upper arm and wrist area tend to be stressed on one side and as a result, cooperating muscles (agonists and antagonists) are non-uniformly stressed which can also result in impairment or chronic pain. As a result, the freedom of movement of persons who are already dependent on a wheelchair in any case can be even more severely restricted.

In addition to these disadvantages relating to the locomotor system, it has also been found in simulations that the movement sequence for driving a wheelchair with hand rims is inefficient since a considerable part of the muscular drive power is not transferred to the wheelchair wheels.

Electric wheelchair drives which avoid some of the preceding disadvantages are certainly known from the prior art. However, their range depends primarily on the capacity of the energy storage device and the electric drive not only brings with it a higher additional weight but also has a negative effect on the size and therefore also on the maneuverability of the wheelchair.

In addition, so-called hand lever wheelchairs are known from the prior art, such as inter alia from DE 3413312 A1, in which the drive of the wheelchair is accomplished by means of a pivotable lever. In this case, for driving the wheelchair two levers arranged substantially vertically are pressed or pivoted forwards and the torque produced is transferred to the wheelchair wheels. For resetting the lever, this is released by a free-wheeling mechanism.

It is true that this type of drive is completely suitable for covering large distances but the maneuverability is restricted as a result of the arrangement of the levers. Furthermore, the lever must be reset after each pivoting which does not allow any continuous drive movement and makes handling difficult. Furthermore the angle range of the lever which can be used for the propulsion is restricted, which combined with the requisite resetting of the levers has a restrictive effect on the attainable speed.

Furthermore, racing wheelchairs having an additional front wheel which is driven by a crank handle and a chain are known from the field of sports. However these racing wheelchairs are not suitable for everyday use on account of the additional front wheel and the associated reduced maneuverability.

Furthermore, wheelchairs having crank drives are known from the prior art. Inter alia, U.S. Pat. Nos. 4,758,013 A, 6,910,701 B1, WO 2004/110329 A1 and U.S. Pat. No. 5,037,120 A disclose such wheelchairs in which the rotational motion of a crank is transferred to the wheelchair wheel with the aid of a chain. A disadvantage is that the crank drive cannot be adapted to the body size of the person driving.

WO 2014/199110 A1 also discloses a crank drive for a wheelchair which can be fastened directly at the centre point of the wheelchair wheel and which also has a gear change. The lever is variable in length so that the user can find the setting suitable for him in combination with the different gears. A disadvantage however is that due to the comparatively low arrangement of the lever, only a little muscle power can be transferred to the wheelchair wheels and the joints of the upper extremities are severely stressed.

It is therefore the object of the invention to reduce or completely eliminate at least individual disadvantages of the prior art. The invention therefore in particular has the aim of providing a mechanical wheelchair drive suitable for everyday use or a wheelchair fitted therewith, which limits the risk of long-term damage for joints and muscles whilst at the same time increasing the progressive motion efficiency.

The formulated object is achieved in this case whereby the lever has a variable length and can be guided along a guide of a guide plate, which guide is closed in itself and which deviates from the circular form, so that a length variation of the lever takes place during the rotational motion. As a result, with the wheelchair drive according to the invention, a continuous rotational motion which deviates from the circular form and is at the same time guided is made possible and transferred to the wheelchair wheel, with the result that the muscles and joints of a person driving are largely protected and a continuous, i.e. substantially jerk-free driving of the wheelchair is accomplished. The invention is in this context based on the finding that a guide of the variable-length lever deviating from the circular form during the rotational motion brings about a more uniform stressing of the muscles of the upper extremities acting both as agonists and also as antagonists and deflects the joints less severely. In particular, due to the guide deviating from the circular form, it is possible to stress and deflect the muscles and joints involved only within ranges within which no (long-term) damage occurs. Preferably the guide of the guide plate is thus adapted to the joints of a person in such a manner that during the rotational motion the joints are deflected as little as possible. For this purpose the guide can be configured in such a manner that in the usage state of the wheelchair drive the lever, in a substantially parallel position to a backrest of the wheelchair, has a shorter length than in a position substantially perpendicular to the backrest of the wheelchair. For a continuous rotational motion the guide in particular has no discontinuity points. In order to enable the length variability of the lever, the lever can be telescopic or at least comprise two rail elements which can be displaced into one another. In order that the lever can be guided through the guide of the guide plate during the rotational motion, the guide is preferably configured as a slot guide which is closed in itself by means of which a guide pin fastened to the lever is guided. Alternatively the guide can also be configured as a guide rail which is closed in itself, by means of which a guide carriage or a hook fastened to the lever is guided. It is obvious that the guide pin, the guide carriage or the hook can be mounted by additional bearing means for better guidance. “Closed in itself” means in this context that the guide has no beginning and also no end and thus enables a closed rotational motion. In order to enable a change in the hand position during the rotational motion without needing to release the handle in this case, the handle is preferably fastened rotatably to the lever. In the usage state of the wheelchair drive the guide plate is arranged substantially perpendicular to a seat surface of the wheelchair.

In order to enable a compact design of the wheelchair drive, in a preferred embodiment it is provided that the lever has a lever part mounted rotatably at a fastening point of the guide plate and an extendable lever part guided along the guide. Preferably the rotatably mounted lever part at the fastening point is connected via a ball bearing or a swivel joint to the guide plate. The rotatable or the extendable lever part can in particular be pushed into one another in a telescopic or rail-like manner. Preferably a linear guide with recirculating ball bearing is used here to minimize the friction. The handle is preferably fastened to the extendable lever part.

In order that the wheelchair drive can be adapted to the respective body size of the driving person, it is favourable if a horizontal adjusting device is provided for the adjustable fastening of the guide plate and the lever along a horizontal. As a result, it is possible to fasten the guide plate and the lever horizontally at various points in the usage state. A horizontal is in this case an imaginary line running substantially parallel to a base surface in the usage state of the wheelchair drive and pointing in the direction of travel of the wheelchair. The fastening can be accomplished in this case with the aid of fastening means such as, for example, fastening pins, clamps or locking hooks at positions provided for this purpose.

In a preferred embodiment, a vertical adjusting device is additionally provided for the adjustable fastening of the guide plate and the lever along a vertical. It is thereby possible to fasten the guide plate and the lever in the usage state vertically at various positions. A vertical is in this case an imaginary line arranged substantially perpendicular to a base surface in the usage state of the wheelchair drive. The fastening can be accomplished in this case with the aid of fastening means such as, for example, fastening pins, clamps or locking hooks at positions provided for this purpose.

In order to be able to adjust the horizontal and/or vertical adjusting device rapidly and individually, it is advantageous if the adjusting device comprises a rail with fastening holes and a carriage with a fixing pin which carriage slides along the rail, wherein the fixing pin can be introduced into the fastening holes for fixing the carriage and wherein the guide plate and the lever are connected indirectly or directly to the carriage. In this case, in a particularly preferred embodiment it is provided that the vertical and the horizontal adjusting device each comprise a rail and a carriage and that the vertical adjusting device, in particular the rail thereof together with the carriage thereof, is fastened to the carriage of the horizontal adjusting device and that the guide plate and the lever are fastened to the carriage of the vertical adjusting device. As a result, in the usage state of the wheelchair drive, an adjustability of the wheelchair drive is provided in a plane perpendicular to a base surface. In this particularly preferred embodiment, the guide plate and the lever are connected directly to the carriage of the vertical adjusting device and indirectly via the carriage and the rail of the vertical adjusting device to the carriage of the horizontal adjusting device. It is also feasible to swap the roles of the vertical and horizontal adjusting device so that the horizontal adjusting device, in particular the rail thereof together with the carriage thereof, is fastened on the carriage of the vertical adjusting device and the guide plate and the lever is fastened on the carriage of the horizontal adjusting device.

In order to drive a wheelchair wheel in a particularly simple manner, in a preferred embodiment it is provided that the force transfer unit is formed by a belt drive. As a result, a complex and error-prone transmission with gear wheels can be dispensed with and wearing parts can easily be exchanged.

In order to keep the installation size of the wheelchair drive small, it is favourable if a belt receives the rotational motion of the lever via a first roller, in particular a first toothed belt wheel, and delivers it to a second roller, in particular a second toothed belt wheel, for transfer of the rotational motion to a wheelchair wheel. Preferably in this case, the belt is formed by a band which is closed in itself having a profiled inner side, preferably a toothed belt. The first roller can in particular be connected directly to the lever in a rotation preventive manner and thus transfer the rotational motion of the lever to the belt. The second roller is also connected to the belt and adapted to transfer the rotational motion to a wheelchair wheel, wherein the force transfer to the wheelchair wheel is preferably accomplished via a belt drive with tensioning device. For the transfer of the rotational motion of the lever to the wheelchair wheel, a transmission can additionally be provided at the first and/or the second roller. For example, the second roller can be connected in a rotation preventive manner to a transmission roller which has a different diameter and thus connects the belt to the belt drive in a transmitting manner or directly to the wheelchair wheel, wherein the belt drive or the wheelchair wheel is in contact with the transmission roller.

In order to provide a wheelchair drive which is as compact as possible, in a particularly preferred embodiment deflecting rollers are provided so that the belt can be guided substantially along an outer side of the wheelchair drive, in particular along the rails. If adjusting devices are provided, these deflecting rollers are attached in particular to the carriages.

In order to avoid injuries when the wheelchair is travelling downhill, it is favourable if the force transfer unit comprises a preferably de-activatable freewheeling mechanism for transferring the rotational motion of the lever in only one direction of rotation. Advantageously, the transmitted direction of rotation of the lever corresponds to the forward direction of rotation of the wheelchair wheel in the usage state. As a result of the free-wheeling mechanism, safety is increased in particular on sloping ground surfaces since in this case the rotation of the wheelchair wheel is not transferred to the rotation of the lever.

In order to nevertheless enable a safe braking of the wheelchair in particular when using a free-wheeling mechanism, it is advantageous if an actuating lever for a braking device of the wheelchair drive is provided on the handle. The actuating lever can in turn be connected to a braking device of the wheelchair wheel via a cable pull, a Bowden cable or a hydraulic line. The braking device can in this case, for example, comprise a disk or drum brake.

In order to retrofit existing wheelchairs with the wheelchair drive according to the invention, at least one fastening device can be provided for fastening on a wheelchair, in particular on an armrest holder of a wheelchair. Accordingly, the wheelchair drive can be fastened instead of an armrest of a wheelchair.

With the wheelchair drive according to the invention, in particular the joints and muscles of the upper extremities required to execute the rotational motion are protected and the power produced by the muscles and transferred to the wheelchair wheels is optimized or increased. In order to stress the muscles or joints only in those regions, i.e. stretching and flexion angles, which do not cause any (permanent) damage or pain during regular use of the wheelchair drive, it is favourable if the guide corresponds to a substantially droplet-shaped closed curve having a wide and a narrow end curve region, wherein the end curve regions each have an vertex point and the narrow end curve region of the closed curve in the mounted state of the wheelchair drive points in the direction of a backrest of the wheelchair. This curve shape is the result of an optimization problem in which the power transferred from the musculature to the wheelchair wheel was maximized whilst reducing the deflection of the joints. The end curve regions can in this case be approximated by circular arcs. The narrow end curve region of the curve according to the invention has a smaller approximate curve radius than the wide end curve region.

A particularly efficient curve form with regard to the force transfer and protecting the joints is obtained if in the mounted state of the wheelchair drive a longitudinal axis running between the vertex points of the wide and the narrow end curve region is inclined by at least 5°, preferably at least 10°, preferably substantially 15° but no more than 30° with respect to the horizontal, in particular with the wide end curve region downwards. In the usage state the wide end curve region is therefore preferably inclined towards a ground surface.

A particularly favourable embodiment is obtained if the curve can be described substantially by the following mathematical equations:

$$X_1 = A\cos(\theta)$$

$$Y_1 = B\sin(\theta)\sin^n(0.5*\theta)$$

-continued $$\begin{pmatrix} X \\ Y \end{pmatrix} = \begin{pmatrix} \cos(\beta) & -\sin(\beta) \\ \sin(\beta) & \cos(\beta) \end{pmatrix} \begin{pmatrix} X_1 \\ Y_1 \end{pmatrix}$$

wherein θ corresponds to an angle as running coordinate, the coordinates X and Y describe the course of the guide in a Cartesian coordinate system, the parameter β is specified between −20° and 30°, the parameters A and B are specified between 0.01 m and 0.25 m and the parameter n is specified between 0.2 and 0.9. The running coordinate θ preferably has values between 0 and 2*π or between 0° and 360°. The curve described by the given equations substantially corresponds to a particularly favourable course of the guide. This can also be mirrored depending on the manner of observation. However, the actual orientation of the guide described by the curve in the mounted state of the wheelchair drive is configured in such a manner that the narrow end curve region points in the direction of a backrest of the wheelchair and the longitudinal axis is inclined with the wide end curve region downwards, i.e. towards a ground surface. The course of the guide can expediently deviate slightly from the curve described by the above equations in order, for example, to smooth discontinuities. In particular, in the narrow end curve region it is favourable for the rotational motion of the lever if the curve or the guide is flattened.

The initially formulated problem is additionally achieved by a wheelchair with a mechanical wheelchair drive, which is connected to at least one wheelchair wheel and in which the wheelchair drive is configured according to the above description.

In a preferred embodiment it is provided that two wheelchair wheels are provided on the wheelchair which are each connected to a wheelchair drive.

BRIEF DESCRIPTION OF THE FIGURES

The invention is explained further hereinafter with reference to preferred embodiments. In the figures.

DETAILED DESCRIPTION

Figure 1:
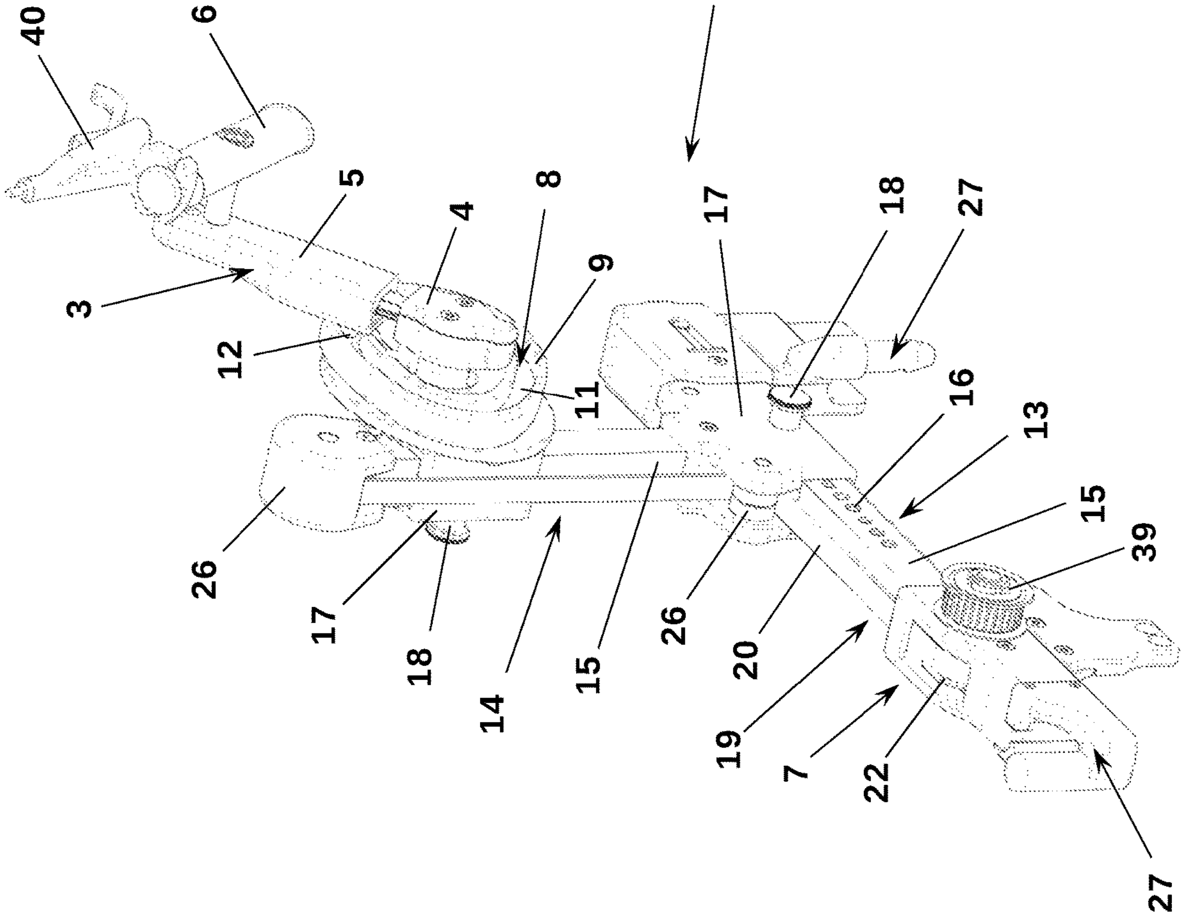
FIG. 1 shows a wheelchair drive according to the invention in an oblique view.

FIG. 1 shows a mechanical wheelchair drive 1 for a wheelchair 2 in a preferred embodiment. The wheelchair drive 1 comprises a lever 3 with a variable length which consists of a rotatably mounted lever part 4 and an extendable lever part 5 to which in turn a preferably rotatable handle 6 is fastened. The rotational motion of the lever 3 can be transferred to a wheelchair wheel 34 (not shown) by means of a force transfer unit 7. In order to brake the wheelchair, the handle 6 can have an actuating lever 40 for a braking device 41 of the wheelchair wheel 34 (cf. FIG. 4). The actuating lever 40 can in this case be connected to the braking device 41 via a cable pull (not shown).

In order to accomplish a length variation of the lever 3 during the rotational motion, the rotatably mounted lever part 4 is mounted rotatably at a fastening point 10 of a guide plate 9 and the extendable lever part 5 is guided in a guide 8 of the guide plate 9, which guide 8 is closed in itself. Preferably the guide 8 is formed by a slot guide 11 in which a guide pin 12 fastened to the extendable lever part 5 slides. Alternatively the guide 8 can also be configured as a guide rail which is closed in itself, along which a guide carriage or hook fastened to the extendable lever part 5 slides. The guide pin 12, the guide carriage or the guide hook can be mounted by additional bearing means for better guidance.

In order to be able to adapt the wheelchair drive 1 to the respective user, preferably a horizontal adjusting device 13 and a vertical adjusting device 14 are provided. By means of the horizontal adjusting device 13, the guide plate 9 and the lever 3 can be fastened at various positions along a horizontal, i.e. in the usage state substantially in the direction of travel of the wheelchair. By means of the vertical adjusting device 14 the guide plate 9 and the lever 3 can be fastened at various positions along a vertical, i.e. in the usage state substantially at right angles to a ground surface. In the embodiment shown the adjusting devices 13, 14 each have rails 15 with fastening holes 16 and carriages 17 with fastening pins 18. In addition, the rail 15 of the vertical adjusting device 14 is connected to the carriage 17 of the horizontal adjusting device 13. In order to adapt the guide plate 9 and the lever 3 to the body size of a person, only the fastening pins 18 need to be removed from the fastening holes 16 and the carriages 17 are displaced along the rails 15 to a suitable position. The fastening pins 18 are then inserted again through the through-holes of the carriage 17 provided for this purpose and into the fastening holes 16 in order to fix the carriage 17.

Furthermore, as can be deduced from FIG. 1 the force transfer unit 7 is formed by a belt drive 19, whereby a belt 20, preferably a toothed belt, transfers the rotational motion of the lever 3 from a first roller (not visible), in particular a toothed belt wheel, to a second roller 22, also in particular a toothed belt wheel. For this purpose the first roller is connected in a rotation preventive manner to the lever 3. As can be seen in particular from FIG. 4, the second roller 22 is preferably connected via a belt drive 23 with a tensioning device 24 to a wheelchair wheel 34. The second roller 22 can, however, also be connected directly to the wheel chair wheel 34. In order to transmit the rotational motion, as in the exemplary embodiment shown, the second roller 22 can be connected in a rotation preventive manner to a transmission roller 39 which has a different diameter and connects the belt 20 in a transmitting manner to the belt drive 23 or the wheelchair wheel 34. In this case, the belt drive 23 or the wheelchair wheel 34, respectively, is in contact with the transmission roller 39.

In order that the wheelchair drive 1 can be designed as compactly as possible, the belt 20 can be guided over deflecting rollers 26 which, in the embodiment shown are fastened to the carriages 17 and the rails 15 so that the belt 20 can be substantially guided along the outer side of the wheelchair drive 1, in particular along the rails 15.

In order to be able to mount the wheelchair drive 1 on a wheelchair 2 (cf. FIG. 4), at least one fastening device 27 can be provided, in particular for fastening to an armrest holder 28 of the wheelchair 2. The fastening device 27, for example, has a mounting rod for insertion into the armrest holder 28.

Figure 2:
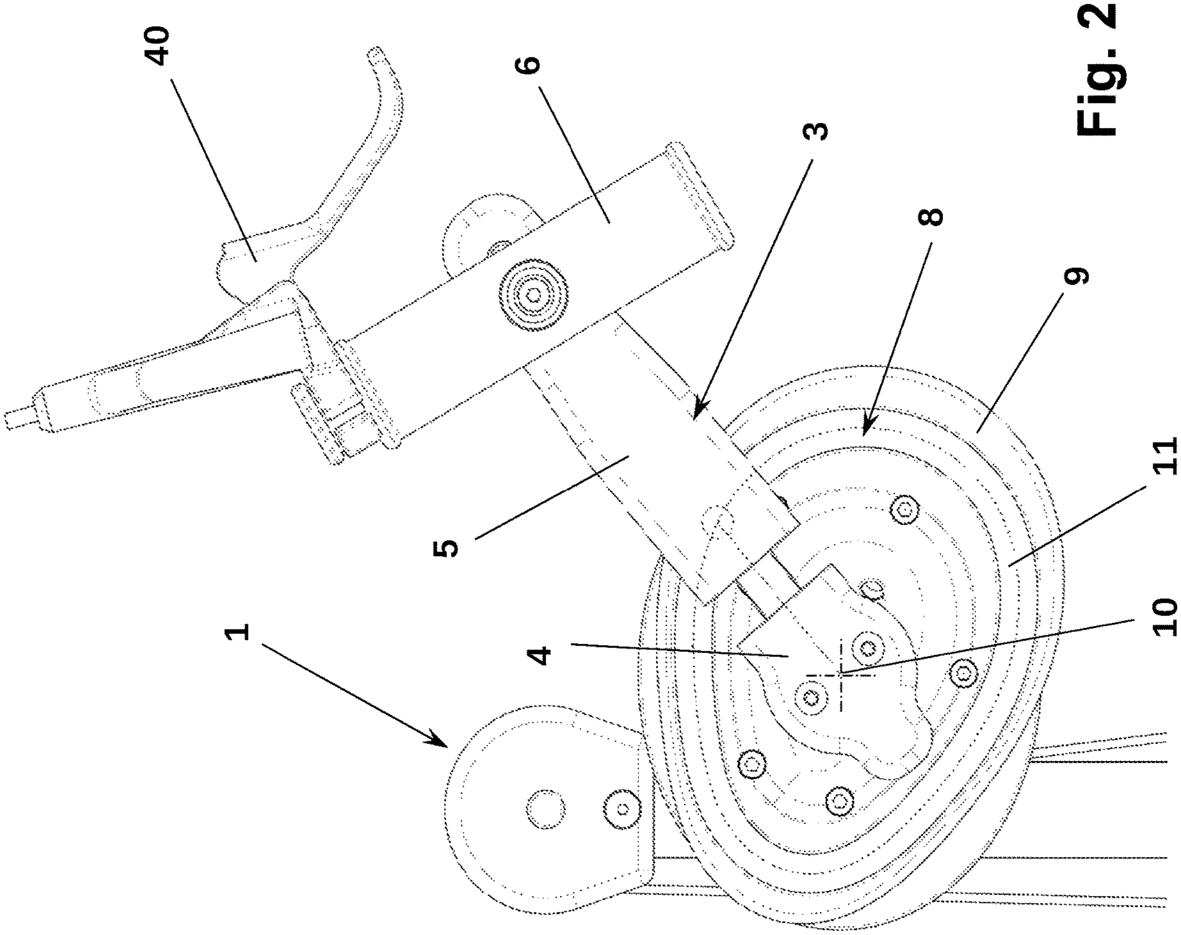
FIG. 2 shows a guide plate together with guide and a variable-length lever in side view.

As can be seen from FIG. 2, the guide 8 of the guide plate 9 is closed in itself and deviates from a circular form. The guide pin fastened to the extendable lever part 5 slides in the guide 8 and thus brings about the change in length during the rotational motion. As a result of the curve shape deviating from the circular form, the joints of the driving person and protected and at the same time the power transferred from the muscles to the wheelchair wheel 34 is increased. In addition, the muscles involved in the rotational motion are more uniformly loaded and enable a continuous, i.e. jerk-free progressive movement.

Figure 3:
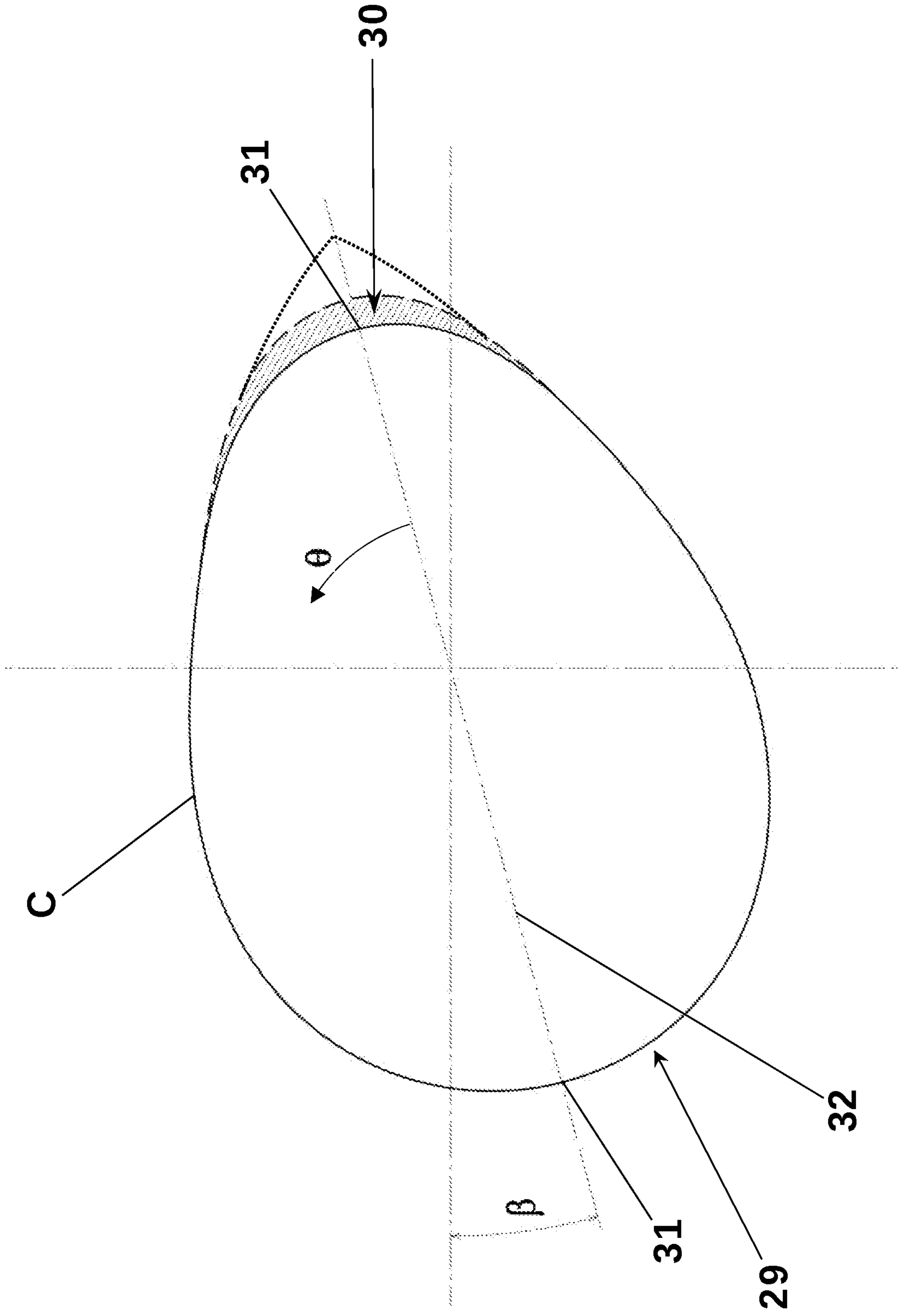
FIG. 3 shows a particularly preferred embodiment of a curve by means of which the guide can be described.

FIG. 3 shows a closed curve C in a Cartesian coordinate system which corresponds to the course of the guide 8 in a particularly preferred embodiment. The fastening point 10 of the lever 3 would be positioned at the origin of the coordinate system. The depicted curve C can in this case be substantially described by the following equations:

$$X_1 = A\cos(\theta)$$

$$Y_1 = B\sin(\theta)\sin^n(0.5*\theta)$$

$$\begin{pmatrix} X \\ Y \end{pmatrix} = \begin{pmatrix} \cos(\beta) & -\sin(\beta) \\ \sin(\beta) & \cos(\beta) \end{pmatrix}\begin{pmatrix} X_1 \\ Y_1 \end{pmatrix}$$

wherein θ as running coordinate corresponds to an angle between 0 and 2*pi or 0° and 360°. The coordinates X and Y describe the course of the guide 8 in the Cartesian coordinate system. In the diagram shown the parameter β was selected as 15.95°, the parameter A was selected as 0.151 m, the parameter B was selected as 0.152 m and the parameter n was selected as 0.7. The course of the curve which corresponds to the dotted line can be flattened towards the continuous line to avoid discontinuities and for better guidance of the lever 3.

The depicted curve C has a substantially droplet-shaped profile and has a wide 29 and a narrow end curve region 30. The end curve regions 29, 30 each have an vertex point 31 which are connected to one another by a longitudinal axis 32. The longitudinal axis is inclined by an angle β of preferably 15° in the mathematically positive direction so that the wide end curve region 29 is inclined downwards. In the mounted state of the wheelchair drive 1, the narrow end curve region 30 of the closed curve C preferably points in the direction of a backrest 33 of the wheelchair 2 (cf. FIG. 4). As a result, a particularly joint-protecting rotational motion is obtained.

Figure 4:
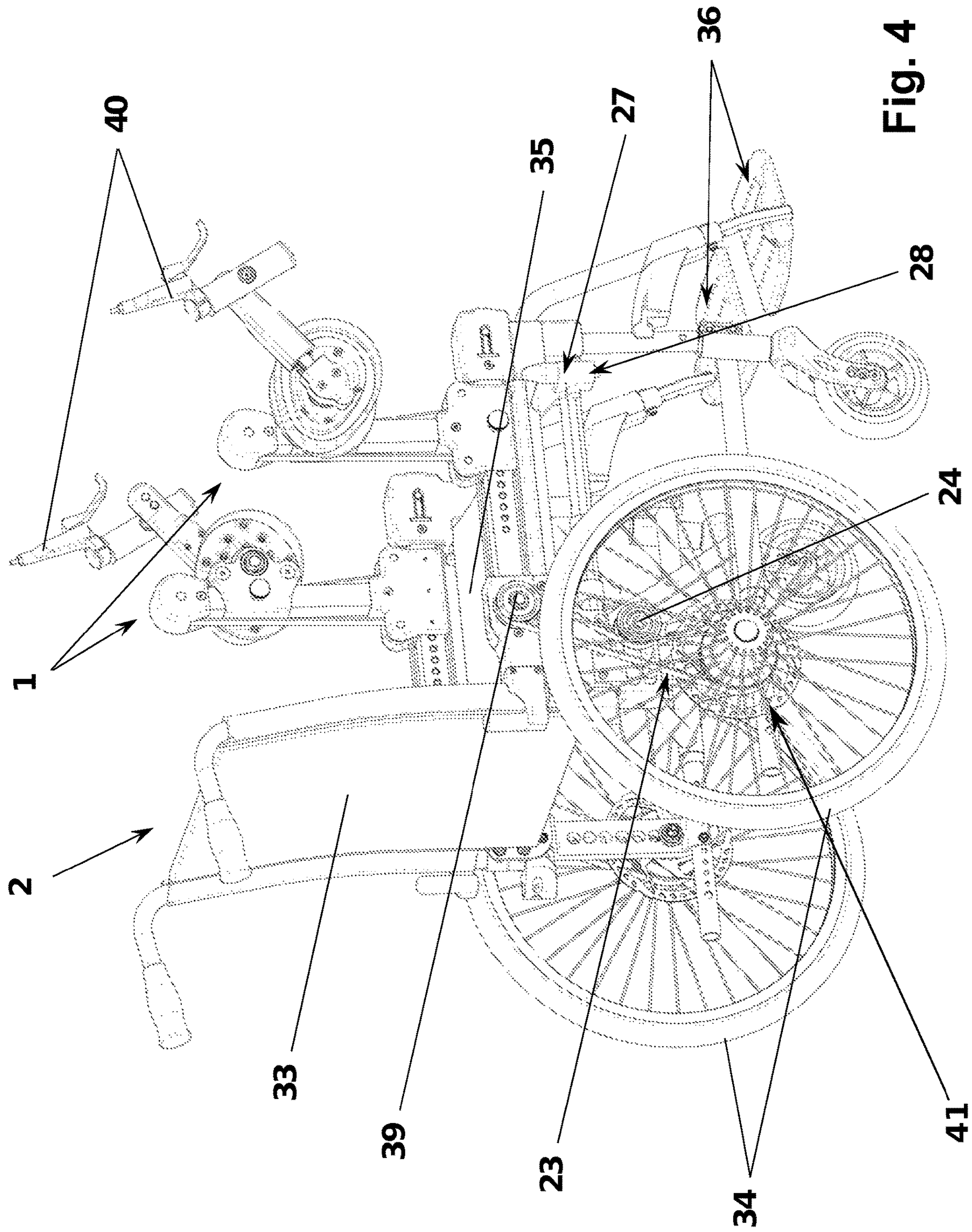
FIG. 4 shows a wheelchair with a wheelchair drive according to the invention.

FIG. 4 shows two wheelchair drives 1 each in combination with respectively one wheelchair wheel 34 of a wheelchair 2. The wheelchair 2 can, as is known from the prior art, have a seat surface 35, a backrest 33 and two footrests 36. By using two wheelchair drives 1, each wheelchair wheel 34 can be driven individually by means of respectively one wheelchair drive 1. As can be seen in FIG. 4, each of the two wheelchair drives 1 is connected to the wheelchair 2 in each case via the fastening devices 27. The rotational motion of a lever 3 is transmitted via a belt 20, a first roller and a second roller 22 to a wheelchair wheel 34. For this purpose respectively one wheelchair wheel 34 can be connected via a belt drive 23 with tensioning device 24 to the second roller 22. However, it is also feasible that the second roller is connected directly to a wheelchair wheel 34. A transmission with the aid of a transmission roller 39 connected to the second roller 22 is also possible.

Figure 5:
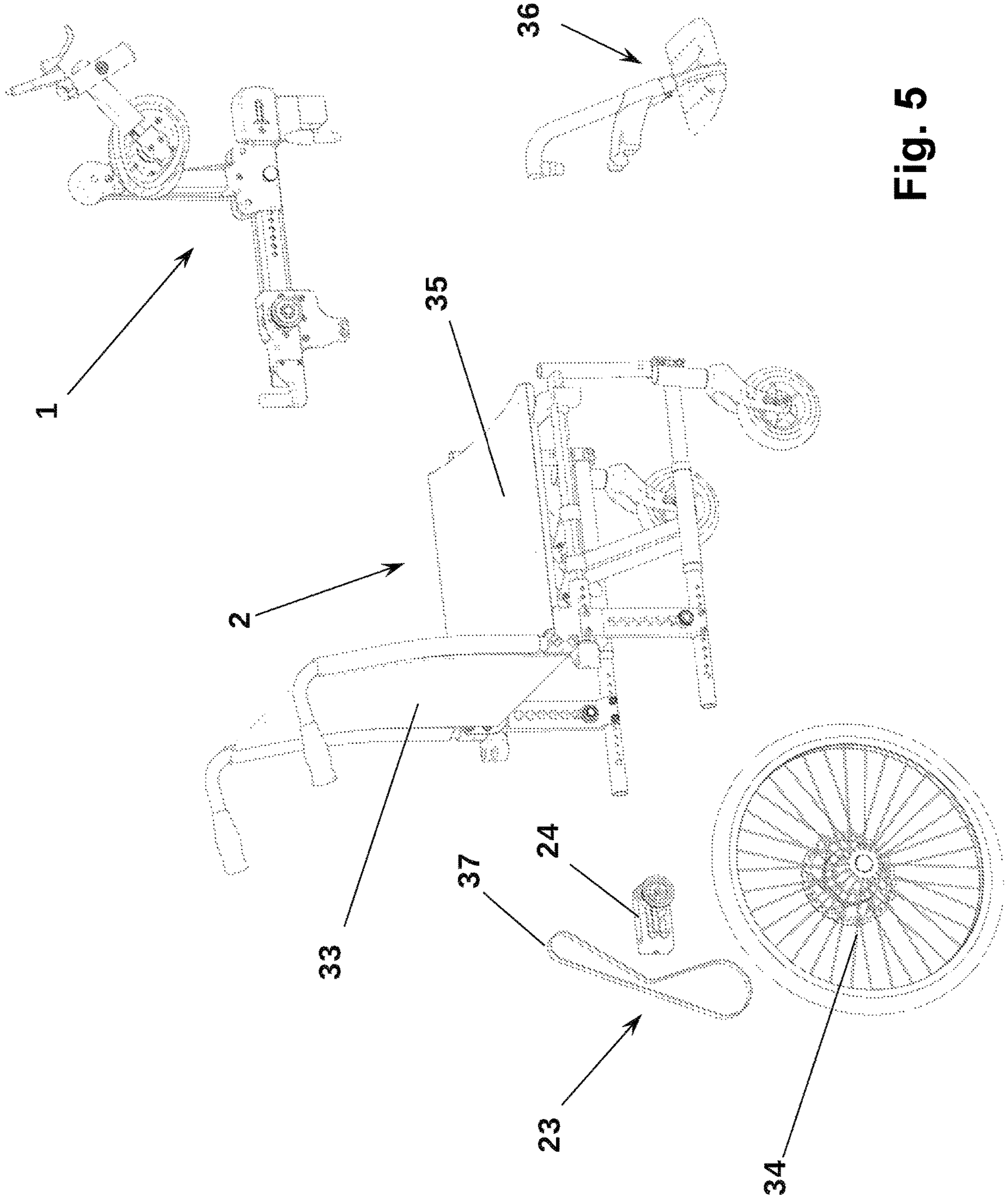
FIG. 5 shows a wheelchair with a wheelchair drive according to the invention in exploded view.

FIG. 5 shows the wheelchair 2 with a wheelchair drive 1 again in exploded view. A second belt 37 of the belt drive 23 together with tensioning device 24 can be seen in the figure.

The invention claimed is:

1. Mechanical wheelchair drive comprising a rotatably mounted lever, a handle fastened to the lever and a force transfer unit configured to transfer a rotational motion of the lever to a wheelchair wheel, wherein the lever has a variable length and can be guided along a closed guide of a guide plate, which guide deviates from the circular form, so that a length variation of the lever takes place during the rotational motion, wherein the guide corresponds to a droplet-shaped closed curve having a wide end curve region and a narrow end curve region, wherein the end curve regions each have a vertex point and the narrow end curve region of the closed curve in a mounted state of the wheelchair drive points in a direction towards a backrest of a wheelchair in a mounted state of the wheelchair drive, a longitudinal axis running between the vertex points of the wide end curve region and the narrow end curve region is inclined by at least 5° but no more than 30° with respect to the horizontal, and wherein the curve can be described by the following mathematical equations:

$$X_1 = A\cos(\theta)$$

$$Y_1 = B\sin(\theta)\sin^n(0.5*\theta)$$

$$\begin{pmatrix} X \\ Y \end{pmatrix} = \begin{pmatrix} \cos(\beta) & -\sin(\beta) \\ \sin(\beta) & \cos(\beta) \end{pmatrix} \begin{pmatrix} X_1 \\ Y_1 \end{pmatrix}$$

wherein θ corresponds to an angle, the coordinates X and Y describe the course of the guide in a Cartesian coordinate system, the parameter β is specified between −20° and 30°, the parameters A and B are specified between 0.01 m and 0.25 m and the parameter n is specified between 0.2 and 0.9.

2. The mechanical wheelchair drive according to claim 1, wherein the lever has a lever part mounted rotatably at a fastening point of the guide plate and an extendable lever part configured to be guided along the guide.

3. The mechanical wheelchair drive according to claim 1, wherein a horizontal adjusting device is provided for the adjustable fastening of the guide plate and the lever along a horizontal.

4. The mechanical wheelchair drive according to claim 3, wherein a vertical adjusting device is provided for the adjustable fastening of the guide plate and the lever along a vertical.

5. The mechanical wheelchair drive according to claim 4, wherein the vertical adjusting device comprises a rail with fastening holes and a carriage with a fixing pin, which carriage can slide along the rail, wherein the fixing pin can be introduced into the fastening holes for fixing the carriage, and wherein the guide plate and the lever are connected indirectly or directly to the carriage.

6. The mechanical wheelchair drive according to claim 3, wherein the adjusting device comprises a rail with fastening holes and a carriage with a fixing pin, which carriage can slide along the rail, wherein the fixing pin can be introduced into the fastening holes for fixing the carriage, and wherein the guide plate and the lever are connected indirectly or directly to the carriage.

7. The mechanical wheelchair drive according to claim 1, wherein the force transfer unit is formed by a belt drive.

8. The mechanical wheelchair drive according to claim 7, wherein the belt drive comprises a belt, a first roller, and a second roller, and wherein the belt is configured to receive a rotational motion of the lever via the first roller and to deliver the rotational motion to the second roller for transfer of the rotational motion to a wheelchair wheel.

9. The mechanical wheelchair drive according to claim 8, wherein deflecting rollers are provided so that the belt can be guided along an outer side of the wheelchair drive.

10. The mechanical wheelchair drive according to claim 8, wherein the first roller is a first toothed belt wheel and the second roller is a second toothed belt wheel.

11. The mechanical wheelchair drive according to claim 1, wherein the force transfer unit comprises a freewheeling mechanism configured to transfer the rotational motion of the lever in only one direction of rotation.

12. The mechanical wheelchair drive according to claim 1, wherein an actuating lever for a braking device of the wheelchair drive is provided on the handle.

13. The mechanical wheelchair drive according to claim 1, wherein at least one fastening device is provided for fastening the mechanical wheelchair drive on a wheelchair.

14. The mechanical wheelchair drive according to claim 13, wherein the fastening device is configured for fastening the mechanical wheelchair drive on an armrest holder of a wheelchair.

15. The mechanical wheelchair drive according to claim 1, wherein the longitudinal axis is inclined with the wide end curve region of the droplet-shaped closed curve downwards.

16. A wheelchair, comprising:

a seat surface;

a backrest;

a first wheelchair wheel and a second wheelchair wheel;

a first mechanical wheelchair drive and a second mechanical wheelchair drive, wherein the first mechanical wheelchair drive is connected to the first wheelchair wheel and the second mechanical wheelchair drive is connected to the second wheelchair wheel, the first and second mechanical wheelchair drives each comprising a rotatably mounted lever, a handle fastened to the lever, and a force transfer unit for transferring a rotational motion of the lever to the first or second wheelchair wheel, respectively, wherein the lever has a variable length and can be guided along a closed guide of a guide plate, which guide deviates from the circular form, so that a length variation of the lever takes place during the rotational motion, wherein the guide is a closed loop in the form of a slot guide, and wherein a guide pin fastened to the lever is configured to be guided in the slot guide; and a first and a second horizontal adjusting device, the first horizontal adjusting device being configured to adjustably fasten the guide plate and the lever of the first mechanical wheelchair drive along a first horizontal in a first plane next to the seat surface and parallel to the first wheelchair wheel, the second horizontal adjusting device being configured to adjustably fasten the guide plate and the lever of the second mechanical wheelchair drive along a second horizontal in a second plane next to the seat surface and parallel to the second wheelchair wheel.

* * * * *